United States Patent
Min

[11] Patent Number: 6,100,871
[45] Date of Patent: Aug. 8, 2000

[54] DYNAMIC POINTER HAVING TIME-DEPENDENT INFORMATIONAL CONTENT

[75] Inventor: Arthur W. Min, Pacifica, Calif.

[73] Assignee: Multitude, Inc., South San Francisco, Calif.

[21] Appl. No.: 09/069,617

[22] Filed: Apr. 29, 1998

[51] Int. Cl.[7] ................................................. G06F 3/00
[52] U.S. Cl. .................. 345/145; 345/977; 345/475; 345/348
[58] Field of Search .................... 345/145, 146, 345/157, 348, 977, 339, 149, 475

[56] References Cited

U.S. PATENT DOCUMENTS

| | | | |
|---|---|---|---|
| 4,306,768 | 12/1981 | Egging | 463/32 |
| 4,653,090 | 3/1987 | Hayden | 345/348 |
| 5,546,521 | 8/1996 | Martinez | 395/155 |
| 5,555,354 | 9/1996 | Strasnick | 345/348 |
| 5,697,843 | 12/1997 | Manship et al. | 463/20 |
| 5,815,142 | 9/1998 | Allard | 345/173 |
| 5,846,086 | 12/1998 | Bizzi et al. | 463/23 |
| 5,898,432 | 4/1999 | Pinard | 345/145 |
| 5,912,668 | 6/1999 | Sciammarella | 345/348 |
| 5,999,176 | 12/1999 | Kamper | 345/341 |
| 6,018,333 | 1/2000 | Denber | 345/145 |
| 6,023,275 | 3/2000 | Beaton et al. | 345/339 |
| 6,037,936 | 3/2000 | Ellenby et al. | 345/339 |

FOREIGN PATENT DOCUMENTS 405073257A  3/1993  Japan  ................. G06F 3/14

OTHER PUBLICATIONS

Michael Chen et al, "A Technique for Specifying . . . Using a 2D Input Device", IEEE, pp. 118–121, Nov. 1987.

Donoho et al, "MacSpin: Dynamic Graphics on a Desktop Computer", U. of California Berkeley, pp. 51–58, Jul. 1998.

Tyson Henry et al., "Multidimensional Icons", ACM Transactions on Graphics, pp. 133–137, Jan. 1990.

Michael Chen et al., "A Study in Interactive 3D . . . 2D Control Devices", Computer Graphics, pp. 121–129, Aug. 1988.

Robert Cohort, "Mastering Windows 3.1 Special Edition", Sybex, 1993.

*Primary Examiner*—Raymond J. Bayerl
*Assistant Examiner*—Thomas J Joseph
*Attorney, Agent, or Firm*—Pennie & Edmonds LLP

[57] ABSTRACT

A system and method for generating a dynamic pointer having time-dependent informational content in a computer system. The system includes an object identification module for identifying objects or areas of interest aligned with the pointer. A pointer appearance selection module is provided for selecting a pointer appearance from a sequential set thereof based on the elapsed time during which the pointer has been aligned with the identified object. The selected pointer appearance is then displayed at the pointer position. In this manner, a substantially continuous visual transformation of the pointer is presented to the viewer while the pointer is maintained in alignment with the object or area of interest.

10 Claims, 6 Drawing Sheets

DYNAMIC POINTER HAVING TIME-DEPENDENT INFORMATIONAL CONTENT

BACKGROUND OF THE INVENTION

1. Field of the Invention

This invention relates generally to computer user interfaces and more particularly to a dynamic pointer system and method for relating time-dependent information to a user.

2. Description of the Background Art

Computer software applications commonly utilize graphical user interfaces (GUIs). An integral feature of a GUI is a pointer which can be moved about the GUI screen by user manipulation of an input device, which typically comprises a mouse. By positioning the pointer over selected text or objects and engaging the mouse buttons, the user may effect certain operations associated with the selected text or object. For example, in a computer game application, the user may fire upon an object by positioning the pointer over the object and clicking or depressing the mouse button.

While the appearance of the pointer in a GUI is typically static, it may be advantageous in certain software applications to employ a dynamic pointer wherein the appearance of the pointer changes according to its position on the screen or upon the occurrence of selected events. The change in the appearance of the pointer conveys information to the computer user, such as the availability or unavailability of various functions associated with the area of the screen coincident with the pointer, or the initiation or progress of a computer operation.

Prior art dynamic pointers tend to fall into two classes: two-state pointers and endless loop pointers. A two-state pointer switches between a first standard pointer appearance (typically an arrow) and a second appearance different from the standard appearance. One example of a two-state pointer is disclosed in U.S. Pat. No. 5,546,521, entitled "Dynamic Presentation of Contextual Help and Status Information," wherein the pointer changes from a first, standard appearance to a second appearance when positioned over a predetermined area of the computer screen. The second appearance of the pointer comprises a window containing contextual help or status information relating to the area of the screen where the pointer is located. When the pointer is moved away from the predetermined area, the pointer resumes its standard appearance.

A second type of pointer is known as an endless loop pointer. The endless loop pointer essentially comprises a repeated animation loop, wherein a succession of closely similar pointer appearances are displayed in rapid succession so as give the pointer an animated aspect. The transformation from a static pointer to an animated pointer is usually triggered by the initiation of a computer operation, such as the loading of a file into a software application. Upon completion of the computer operation, the pointer reverts to its standard static appearance. A well-known example of an endless loop pointer is the "watch" pointer of the Apple® Computer operating system ("OS"). In the Apple® Computer OS, a software application is initiated by positioning the pointer over an icon representing the selected application, and then double clicking the mouse button. While the application is being loaded into memory (which may take several seconds or minutes), an animated pointer is presented on the screen, the animated pointer being in the form of a wristwatch having a minute hand continuously revolving over the watch's face. Once the application has been fully loaded into memory, the pointer's standard appearance is resumed.

What is lacking in the prior art is a dynamic pointer having the capability of presenting information indicative of the progress (rather than simply the occurrence) of a time-dependent event associated with a specific object or area of interest displayed on the monitor.

SUMMARY OF THE INVENTION

The present invention comprises a system and method for generating a dynamic pointer having time-dependent informational content. The system and method may be used in connection with a computer system having a monitor for presenting information to a computer user, a pointer displayed on the monitor, and user-manipulated input device, such as a mouse, for controlling the pointer position.

A preferred embodiment of a system embodying the present invention includes a number of interacting modules, each of which may be implemented in software or hardware form or in a combination of both forms. An object identification module identifies whether the pointer is aligned with an object or area of interest on the monitor's screen. If it is determined that the pointer is aligned with the object, a time counter module then determines the elapsed time during which the pointer has been aligned with the object.

A pointer appearance selection module is provided for receiving input from the object identification module and from the time counter module and accordingly selecting a pointer appearance to be displayed from a sequential set of pointer appearances. The set of pointer appearances comprise a relatively large number of incrementally varying appearances which, when displayed in rapid succession, simulate a continuous or animated progression between states. The pointer appearance selection module is also operative to draw the selected pointer appearance at the pointer position.

The invention further comprises a method for displaying a dynamic pointer on a computer monitor to thereby convey time-dependent information to a viewer. A preferred embodiment of the method includes the initial step of determining the pointer position. The pointer position is then compared with the position of one or more objects or areas of interest to determine if the pointer is aligned therewith. The next step comprises determining an elapsed time during which the pointer has been aligned with the identified object. A pointer appearance is then selected from a sequential set of pointer appearances based on the identified object and the determined elapsed time. Finally, the selected pointer appearance is displayed at the pointer position.

The foregoing dynamic pointer system and method may be advantageously employed in connection with a wide variety of computer applications utilizing GUIs. For example, the dynamic pointer may be used to provide "targeting" information to a user of a computer game. When the user first aligns the pointer with the targeted object, the pointer assumes a first appearance indicating a low probability of hitting the targeted object. As the user maintains over time the alignment of the pointer with the object, a sequence of pointer appearances are selected and sequentially displayed to indicate an increasing possibility of hitting the targeted object. In this manner, the user views a substantially continuous transformation of the pointer over time which simulates to the viewer an aiming or "locking in" of the target.

DETAILED DESCRIPTION OF THE PREFERRED EMBODIMENT

The present invention provides a system and method for generating a dynamic pointer in a GUI. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
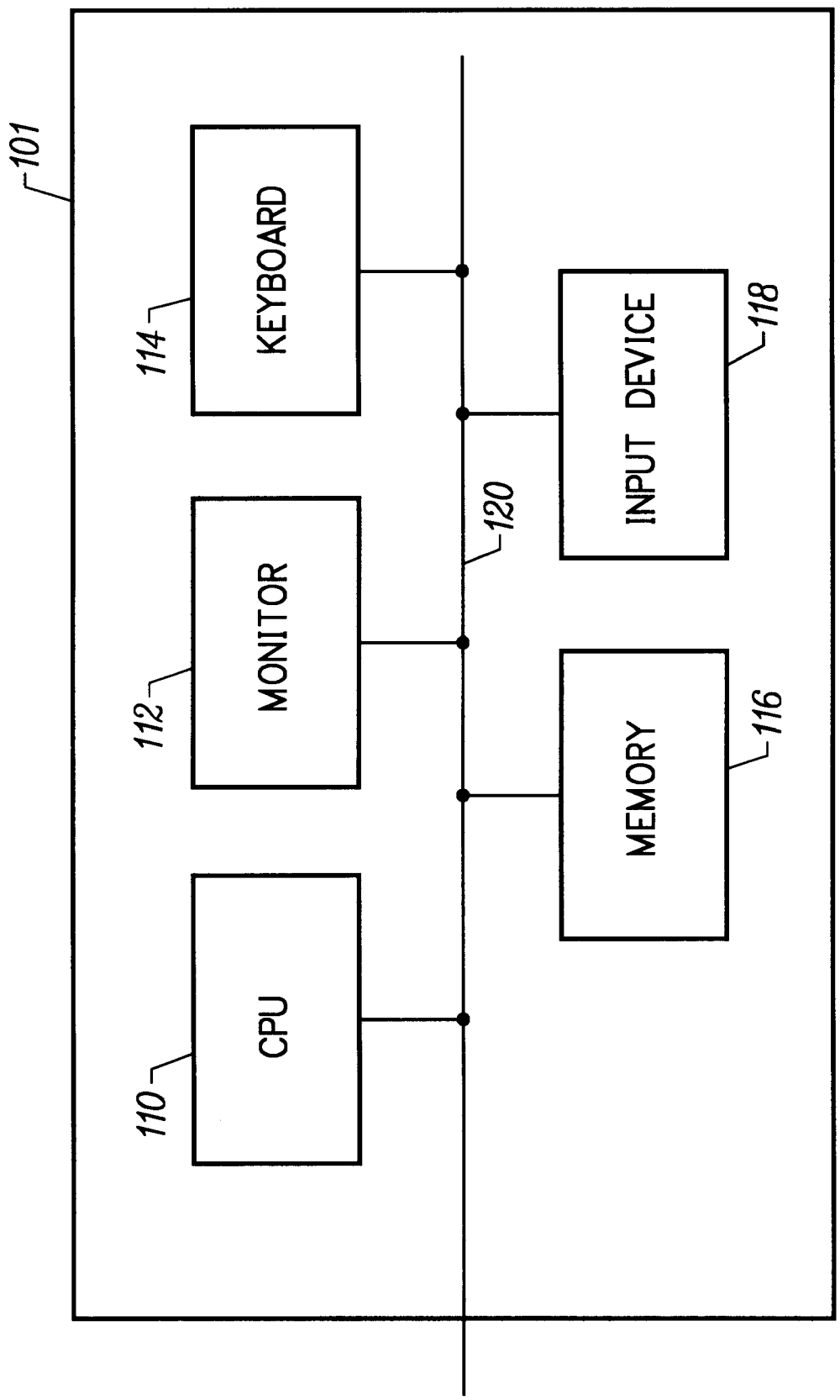
FIG. 1 is a block diagram of a computer system for implementing the dynamic pointer of the present invention.

FIG. 1 is a block diagram of a preferred embodiment of a computer system 101 for implementing the dynamic pointer system and method of the present invention. Computer system 101 includes at least one central processing unit (CPU) 110, monitor 112 for presenting images to the computer user, keyboard 114 for user entry of alphanumeric information, memory 116 for storing program instructions and data of different types, and positional input device 118. The various components of computer system 101 are interconnected for communication by system bus 120. CPU 110 may comprise, for example, an Intel® Pentium® processor. The memory 116 may include volatile random access memory (RAM), non-volatile read only memory (ROM), magnetic or optical disk drives such as hard drives or CD-ROM, or any appropriate combination of the foregoing or equivalents thereto. Input device 118 will typically comprise a conventional mouse, but may alternatively comprise a trackball, joystick, light pen, touchpad, or any other input device capable of generating positional signals responsive to user manipulation of the device. Monitor 112 may comprise a cathode ray tube (CRT) display, a liquid crystal display (LCD), or any other suitable equivalent.

Figure 3:
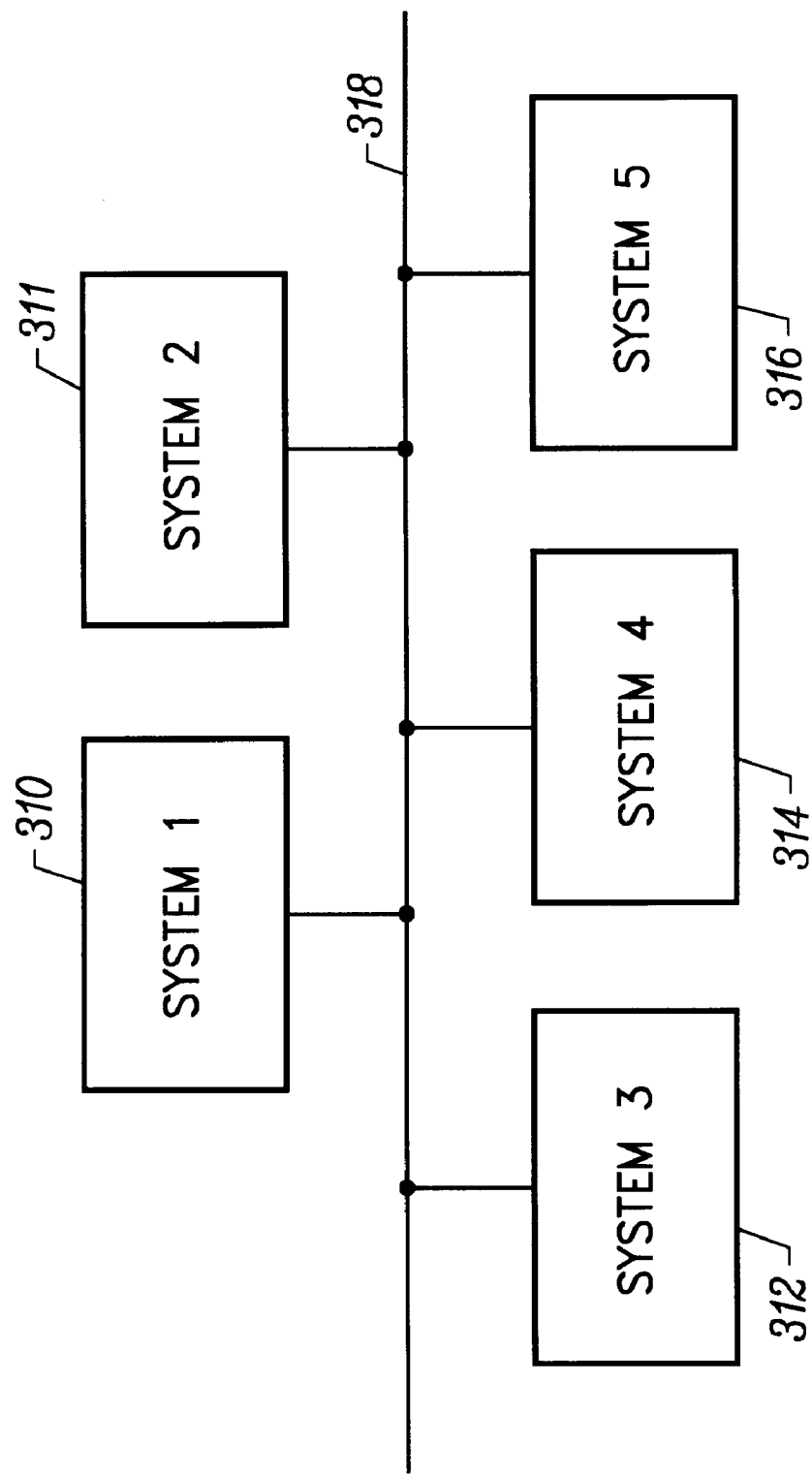
FIG. 3 is a block diagram of plural computer systems linked for communication via a network.

As is depicted in FIG. 3, multiple computer systems (denoted in the drawings as 310, 311, 312, 314 and 316) of the above general description may be linked via network 318 to enable exchange of information between and among the computer systems. Network 318 may be a private network or a public network, such as the Internet. The exchange of information enabled by connection to the network 318 may be utilized, for example, to implement multi-player games in which plural computer users located remotely from each other each participate in a computer game. As is described in further detail below, the dynamic pointer system and method of the present invention provides the further benefit of masking latency problems (delayed response to user input) associated with transfer of information over heavily-trafficked networks.

Figure 2:
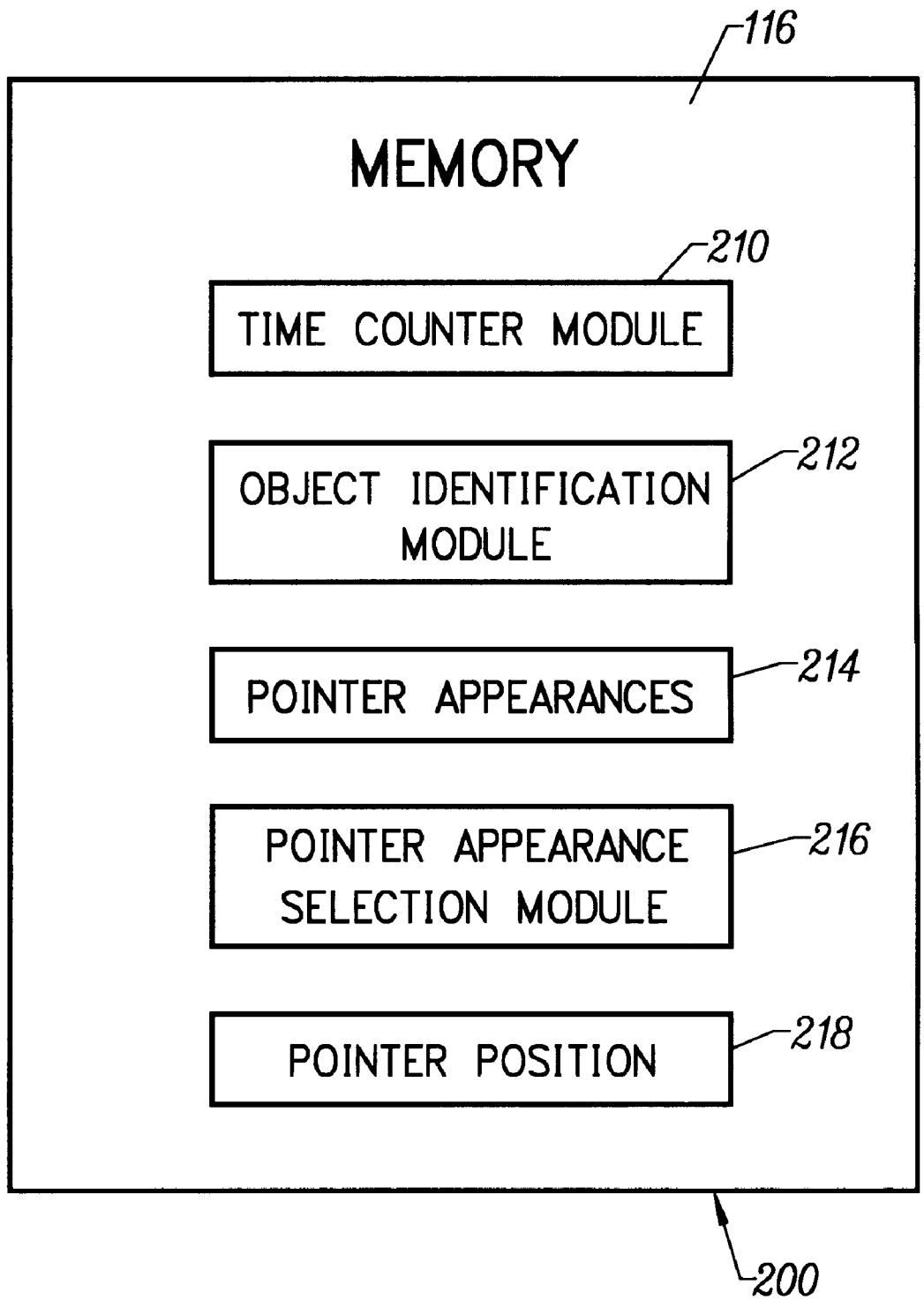
FIG. 2 is a block diagram of the components of a preferred embodiment of the dynamic pointer system residing within the computer system memory.

FIG. 2 depicts in block form the components of a preferred embodiment of a dynamic pointer system 200 of the present invention residing within memory 116 of computer system 101. It is noted that each of the components may be implemented as software (for example, as blocks of C++ or Java program code), as hardware (e.g., ROM) or as a combination of the two. The components of dynamic pointer system 200 include pointer position 218, time counter module 210, object identification module 212, pointer appearances 214, and pointer appearance selection module 216.

Object identification module 212 is configured to retrieve the current pointer position 218 from memory 116. As discussed above, the pointer position is adjusted by user manipulation of input device 118. Object identification module 212 is further configured to determine if the pointer position is coincident with predetermined objects or areas of interest displayed on monitor 112. In a game implementation of the present invention, the objects may represent targets which the user must fire upon and hit to obtain game points. As is known in the art, object identification module 116 may compare pointer position 218 to one or more objects represented as bitmaps to identify which, if any, of the predetermined objects are aligned with the pointer. It is to be appreciated that the objects or areas of interest may either be static or may have time-varying positions.

Time counter module 210 is configured to determine a length of time during which the pointer has been coincident or aligned with the object or area of interest displayed on monitor 112. Data generated by object identification module 212 and time counter module 210 are communicated to pointer appearance selection module 216, which selects according to a predetermined selection process a pointer appearance from the set of pointer appearances 214 for display on monitor 112. The selection process utilized by pointer appearance selection module may embody a simple time-based calculation, i.e., each pointer appearance may correspond to a selected time period during which the pointer has been aligned with the object or area of interest, or may embody a more complex function of several factors, in addition to time.

Figure 4:
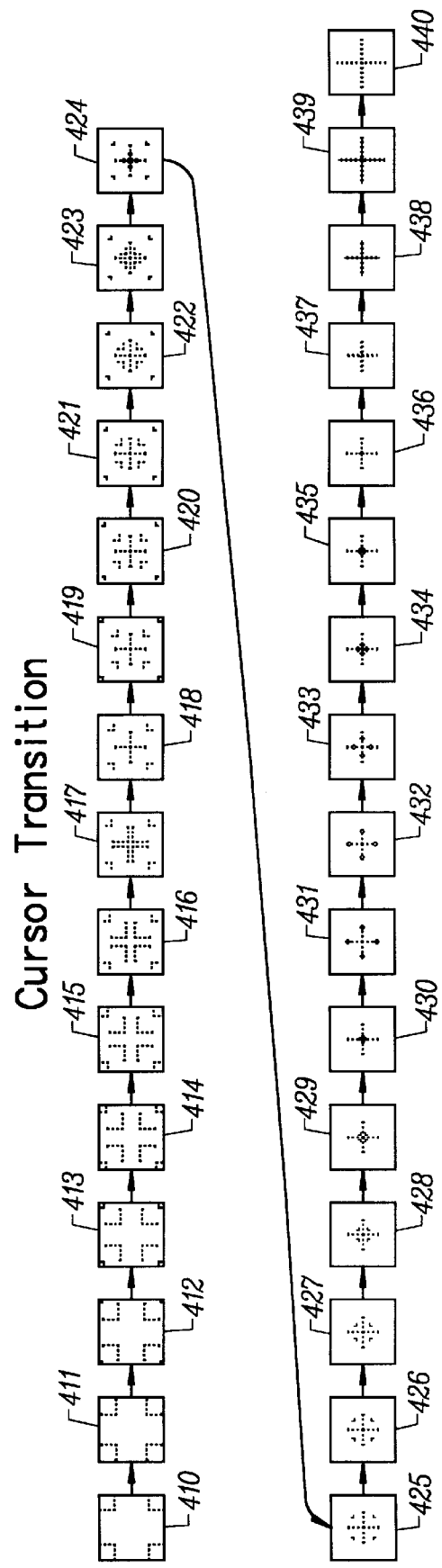
FIG. 4 depicts a sequential set of pointer appearances of a dynamic pointer.

Referring now to FIG. 4, a sequential set 214 of pointer appearances 410 through 440 are depicted. The pointer appearances are preferably stored in encoded form in memory 116. Each of the pointer appearances varies incrementally from the immediately preceding and following appearances such that, when the set of appearances are displayed sequentially in rapid succession, a substantially continuous transformation of the pointer is presented and viewed. The variation in appearance may include variations in size, geometry and/or color. The pointer appearances depicted in FIG. 4, for example, collectively represent a dynamic crosshair in which, as time progresses, the segments of the crosshair converge and change color to indicate that the user is "locking in on a target", i.e., that the probability of successfully hitting the target is getting progressively greater.

It is to be appreciated that because the number of pointer appearances stored in memory 116 is necessarily finite and because the pointer appearances are not displayed in a repeating loop sequence, the pointer will achieve after a certain period of time has expired a final state as represented by pointer appearance 440.

FIGS. 5(a)–(c) depict three discrete pointer appearances 510(a)–(c) of a dynamic pointer employed in connection with a computer game application. According to this implementation of the invention, pointer appearance selection module 216 is configured to calculate a targeting probability (probability of hitting an object) based on the elapsed time during which the pointer has been aligned with the object, and to select a pointer appearance corresponding to the calculated targeting probability. Pointer appearance selection module 216 may additionally cause the targeting probability value to be displayed in window 520 positioned proximate to the pointer.

Figure 5:
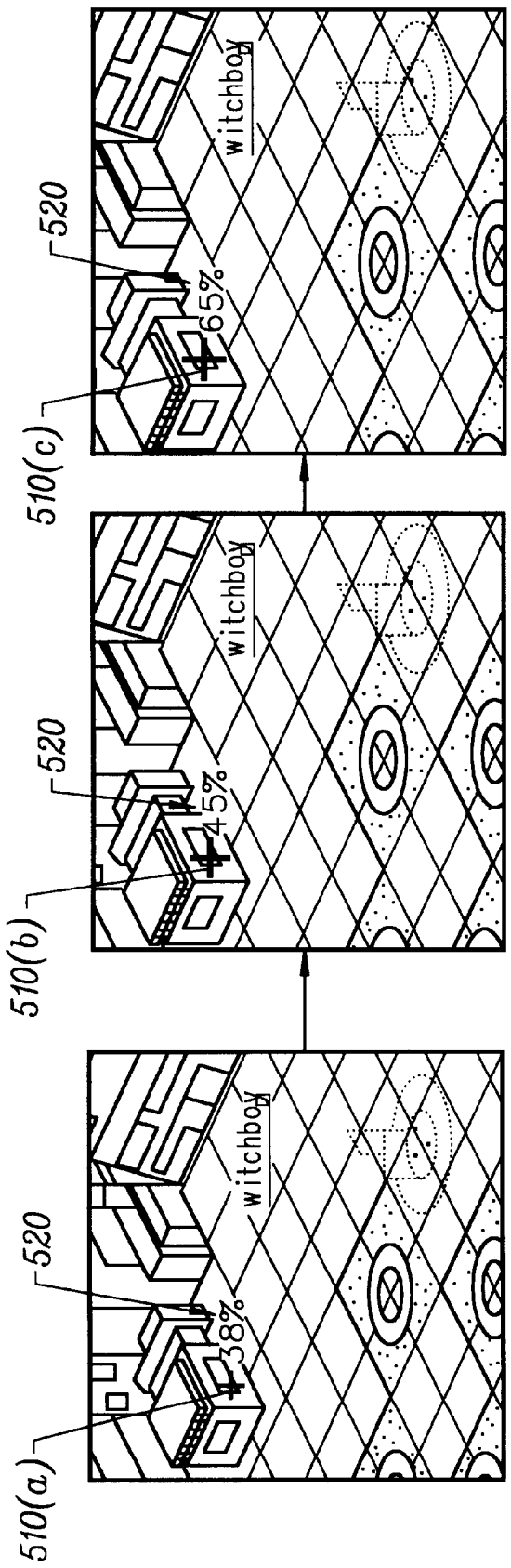
FIGS. 5(a)–(c) depict three discrete pointer appearances of a dynamic pointer employed in a game embodiment.

FIG. 5(*a*) depicts a first pointer appearance 510(*a*) wherein the pointer has been initially aligned with targeted object 512. Because the elapsed time of alignment is a relatively small value, the targeting probability is accordingly small, and a pointer appearance 510(*a*) representative of the low targeting value is displayed. Pointer appearance selection module 216 also displays the numerical value of the targeting probability (here, 38%) in window 520.

FIG. 5(*b*) depicts a second pointer appearance 510(*b*) wherein the pointer has been aligned with the targeted object 512 for a longer period of time. The calculated targeting probability has accordingly increased to 45%, and a corresponding pointer appearance 510(*b*) is selected and displayed by pointer appearance selection module 216. The increased value of the targeting probability is displayed in window 520.

Finally, after the pointer has been aligned with targeted object 512 for an extended period of time, a final maximum targeting probability is attained. In FIG. 5(*c*), pointer appearance selection module 216 selects and displays pointer appearance 510(*c*) corresponding to the maximum value of targeting probability. The maximum numerical value of the targeting probability (65%) is displayed in window 520.

It is noted that while three discrete pointer appearances are depicted in the figures, a user of the computer game will view a large number of pointer appearances sequentially presented so as to produce a gradual and continuous transformation of the pointer. It will be further appreciated that the appearance of the pointer (and optionally the numerical value displayed in window 520) at any given time conveys information to the user concerning the probability of hitting the targeted object.

As alluded to above in connection with FIG. 3, the use of the dynamic pointer system of the invention provides the additional benefit of masking network latency problems in an networked game environment (i.e., a multi-player game wherein plural game users are linked via a public or private network). By presenting probabilistic targeting information to the user via the dynamic pointer, the user's decision-making regarding shooting of targets becomes substantially more deliberate. Because the decision of whether or not to shoot at a target involves a more complex mental process, the user will typically shoot less often, thereby reducing the amount of information which must be transmitted over the network. Furthermore, due to the probabilistic nature of the targeting process, the user will not expect a completely predictable and instantaneous result from the software. In this manner, problems associated with slow network transmission are experienced less often and/or are less noticeable to the user.

Figure 6:
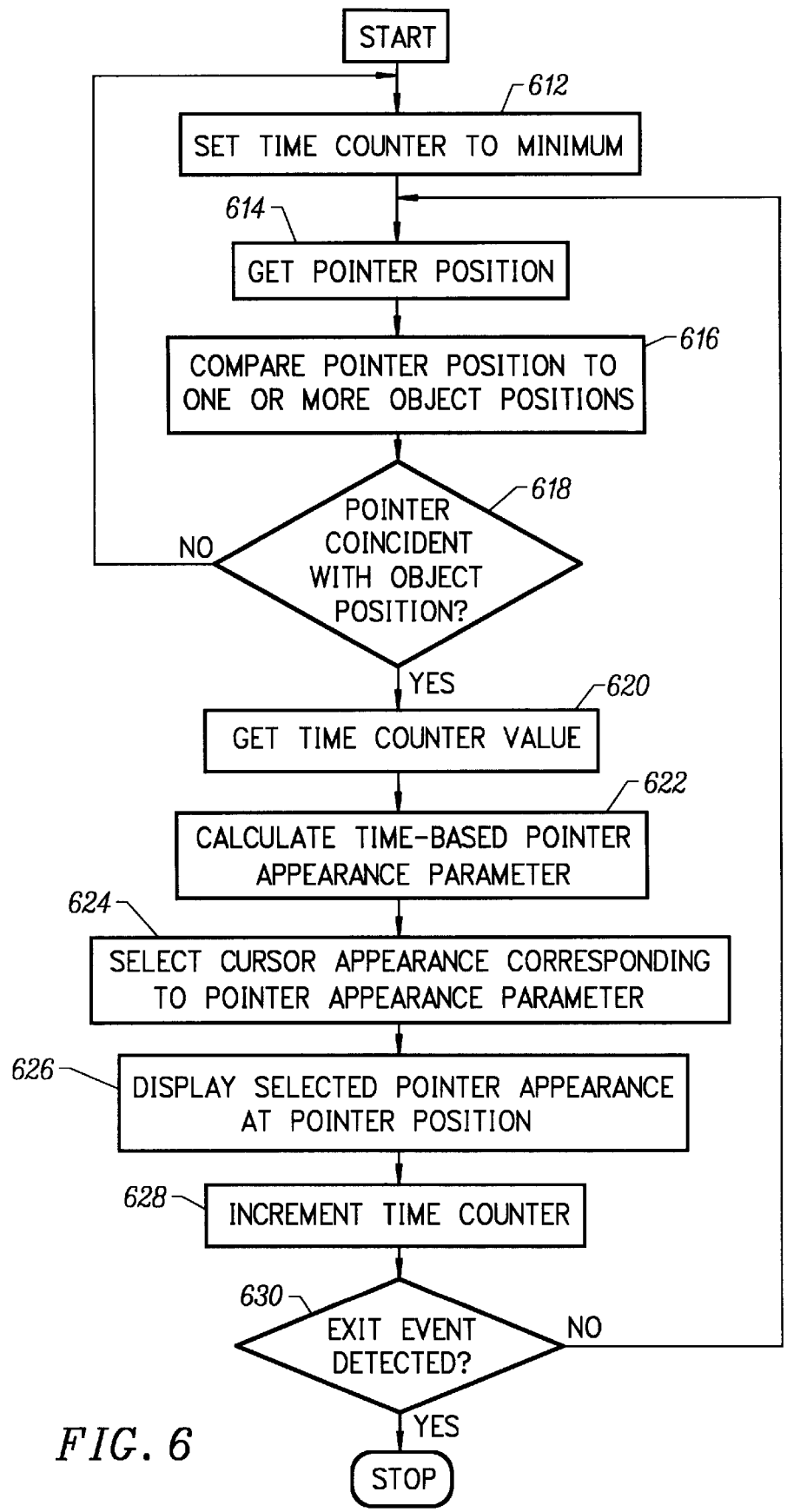
FIG. 6 is a flowchart depicting the steps of a preferred method for generating a dynamic pointer.

Referring now to FIG. 6, a flowchart depicts the steps of a method for generating a dynamic pointer according to the present invention. The method is initialized by setting time counter module 210 to a minimum value, step 612. Object identification module 212 then retrieves 614 pointer position 218 from memory 116. In step 616, object identification module 212 next compares pointer position 218 to the position of one or more predetermined objects or areas of interest displayed on monitor 112. If, in step 618, object identification module 212 determines that pointer position 218 does not coincide with the position of at least one object or area of interest displayed on monitor 112, the method returns to step 612.

If in step 618 object identification module 212 determines that pointer position 218 does coincide with the position of at least one object or area of interest displayed on monitor 112, pointer appearance selection module 216 obtains 620 the current time counter value from time counter module 210. Pointer appearance selection module 216 then processes 622 the information received from object identification module 212 and time counter module 210 to determine a pointer appearance parameter. As discussed hereinabove, the process by which the pointer appearance parameter is determined may be a simple function of the elapsed time, or may alternatively involve a more complex calculation involving other variables in addition to the elapsed time.

In step 624, pointer generation module 216 retrieves a pointer appearance from pointer appearances 214 that corresponds to the calculated pointer appearance parameter determined in step 622. The retrieved pointer appearance is then displayed 626 on monitor 112 at pointer position 218.

In step 628, time counter module 210 increments the time counter value to reflect that the pointer has been aligned with the object for a period of time associated with execution of steps 614 to 628. Next, it is determined 630 whether an exit event has occurred. A typical exit event is a mouse click corresponding to the triggering of a weapon in game application. If it is determined that an exit event has occurred, then the method terminates, step 632.

If it is determined 630 that no exit event has occurred, the method loops back to the step 614 of receiving pointer position 218. If dynamic pointer 510 is still coincident with object 512, then pointer appearance selection module 216 will calculate a different pointer appearance parameter in step 622 based on the incremented time counter value in step 628. The method repeats until an exit event is detected in step 630.

It is appreciated that while the invention has been described with reference to a computer game application, it is not limited thereto. The dynamic pointer may be advantageously employed to provide visual information to the user indicative of the progress of an operation in any application wherein a time-dependent process is associated with one or more objects or areas of interest displayed on monitor 112.

It is further noted that other embodiments of the invention will be apparent to those skilled in the art upon review of this disclosure. Therefore, these and other variations upon the preferred embodiments are intended to be covered by the present invention, which is limited only by the appended claims.

What is claimed is:

1. A dynamic pointer system for use with a computer having a monitor and an input device for controlling a position of a pointer displayed on the monitor, the system comprising:

an object identification module for identifying an object having a position coincident with the pointer position;

a time counter module for determining an elapsed time during which the pointer position has been coincident with the identified object position;

a sequential set of pointer appearances representing a substantially continuous visual progression from a first state to a second state; and a pointer appearance selection module for receiving input from the object identification module and the time counter module, for selecting a pointer appearance from the sequential set of pointer appearances in accordance with the received input, and for displaying the selected pointer appearance at the pointer position;

wherein the pointer appearance selection module is configured to calculate visual information based on the elapsed time, and to display the calculated visual information proximal to the pointer.

2. The system of claim 3, wherein the visual information corresponds to a probability of hitting the identified object.

3. A method for displaying a dynamic pointer on a computer monitor, the method comprising the steps of:

determining a pointer position;

identifying an object having a position coincident with the pointer position;

determining an elapsed time during which the pointer has been aligned with the identified object;

providing a sequential set of pointer appearances representing a substantially continuous visual transformation from a first state to a second state;

selecting one of the pointer appearances from the sequential set based on the identified object and the determined elapsed time;

displaying the selected pointer appearance at the pointer position; and calculating visual information based on the determined elapsed time and displaying the visual information proximal to the pointer.

4. The method of claim 3, wherein the visual information expresses a probability associated with an operation involving the identified object.

5. A method for providing a visual indicator on a computer monitor of the progress of a time-dependent operation, the method comprising the steps of:

determining a pointer position;

identifying an object aligned with the pointer;

identifying a targeting process associated with the identified object;

determining an elapsed time during which the pointer has been aligned with the identified object;

calculating a degree-of-progress parameter based on the determined elapsed time;

providing a sequential set of pointer appearances representing a substantially continuous visual transformation from a first state to a second state;

selecting one of the pointer appearances from the sequential set based on the calculated degree-of-progress parameter; and drawing the selected pointer appearance at the pointer position;

wherein the degree-of-progress parameter represents a probability of hitting the identified object.

6. A computer-readable medium comprising program instructions for performing the steps of:

determining a pointer position;

identifying an object having a position coincident with the pointer position;

determining an elapsed time during which the pointer has been aligned with the identified object;

selecting a pointer appearance from a sequential set of pointer appearances based on the identified object and the determined elapsed time, the sequential set of pointer appearances representing a substantially continuous visual transformation from a first state to a second state; and displaying the selected pointer appearance at the pointer position;

wherein the computer-readable medium further comprises program instructions for performing the step of calculating visual information based on the determined elapsed time and displaying the visual information proximal to the pointer.

7. The computer-readable medium of claim 6, wherein the visual information expresses a probability associated with an operation involving the identified object.

8. The system of claim 2, wherein the visual information is a numerical value.

9. The method of claim 4, wherein the visual information is a numerical value.

10. The computer readable medium of claim 7, wherein the visual information is a numerical value.

* * * * *